Nov. 28, 1944. O. H. SAMUELSON ET AL 2,363,999
METHOD OF FORMING HOLLOW GLASS ARTICLES
Filed July 11, 1942 2 Sheets-Sheet 1
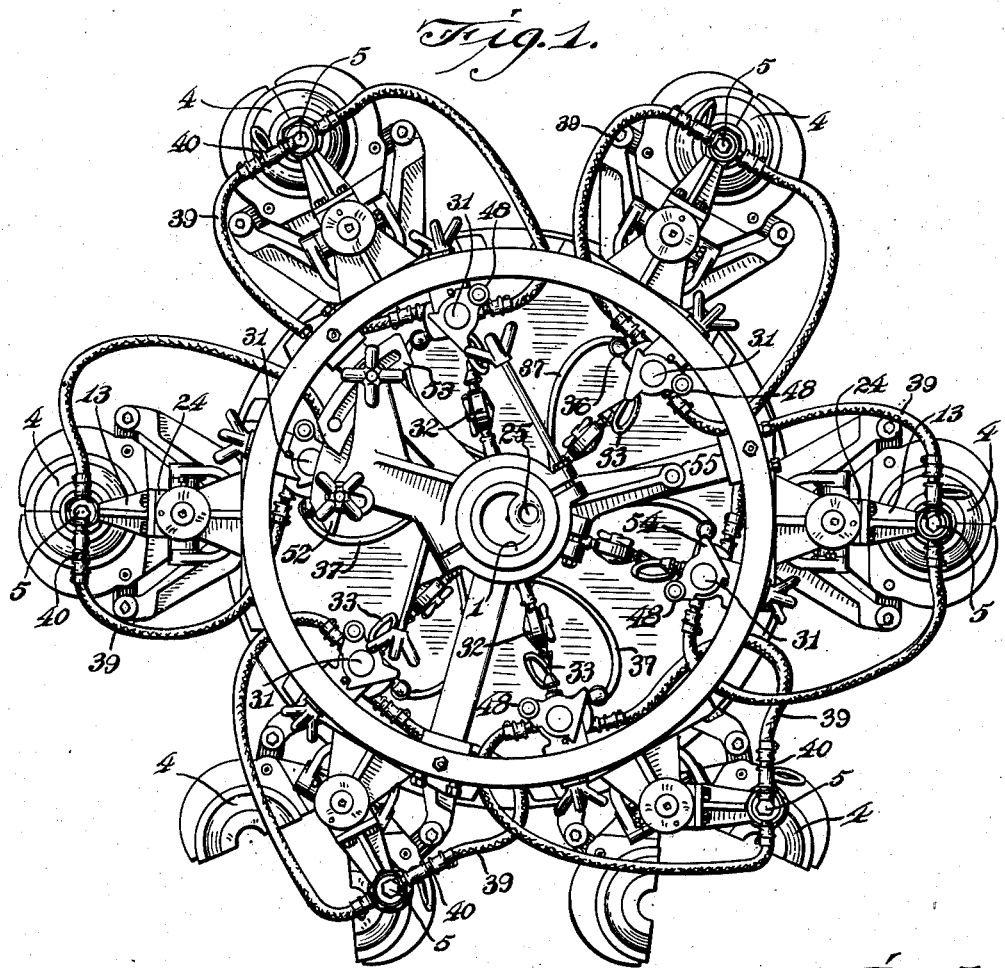
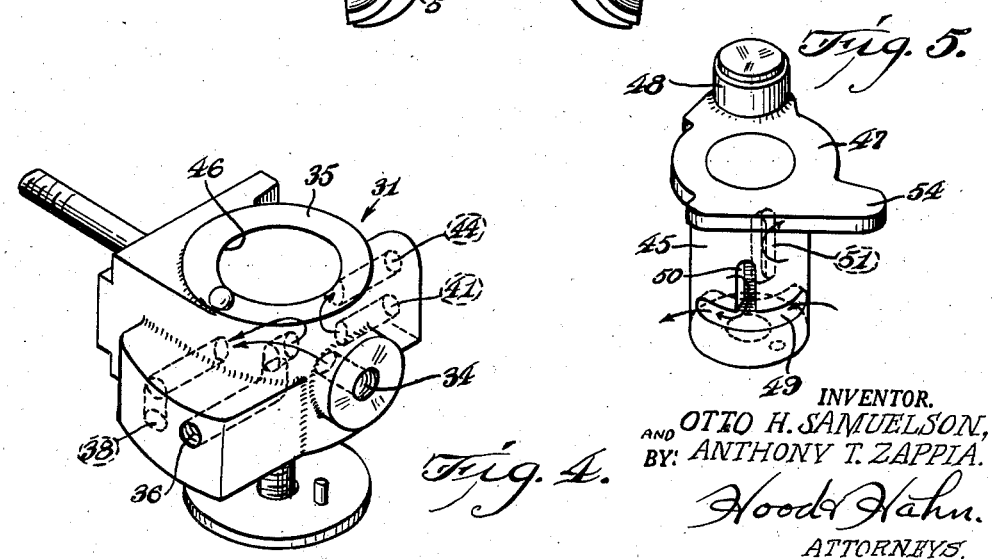
INVENTOR.
OTTO H. SAMUELSON,
AND ANTHONY T. ZAPPIA.
BY: Hood & Hahn.
ATTORNEYS.

Nov. 28, 1944.   O. H. SAMUELSON ET AL   2,363,999
METHOD OF FORMING HOLLOW GLASS ARTICLES
Filed July 11, 1942   2 Sheets-Sheet 2

INVENTOR.
OTTO H. SAMUELSON,
AND
BY: ANTHONY T. ZAPPIA.
Wood & Hahn
ATTORNEYS.

Patented Nov. 28, 1944

2,363,999

UNITED STATES PATENT OFFICE 2,363,999

METHOD OF FORMING HOLLOW GLASS ARTICLES

Otto H. Samuelson and Anthony T. Zappia, Indianapolis, Ind.

Application July 11, 1942, Serial No. 450,538

6 Claims. (Cl. 49—19)

The present invention relates to improvements in methods for molding hollow glass containers.

In the heretofore commercial method and apparatus for molding hollow containers, it has been the usual practice, after the blank has been inserted in the bottle mold, to close the mold, seal the same with a so-called blow head, and admit the air under pressure to the interior of the mold and blank for the expansion of the blank in the mold to form the container. In certain types of apparatus, it has not been unusual to choke the escape of the air under pressure admitted to the mold to create in the mold a pressure for expanding the blank in the mold and, at the same time, permit a circulation of air through the mold or bottle for the purpose of cooling the bottle in order to obtain a relatively quick set or cooling of the bottle prior to delivery from the mold.

This method has been found to be objectionable in that, for one thing, a sufficient pressure cannot be developed without materially slowing up the operation of the machine to properly form the bottle. Furthermore, the air circulation is not rapid enough to sufficiently cool the bottle and, as a result, the method is more frequently than not entirely unsatisfactory. It has been our observation that bottles formed according to the above are not satisfactory, the sides of the bottle have a tendency to sag in and, under certain circumstances where, in order to overcome this sagging, the pressure has been greatly increased, there is a tendency for the glass of the bottle to check on its surfaces resulting in either instance in an imperfect bottle.

It is one of the objects of our invention to provide a method of blowing the blank in the mold to insure a sufficient pressure to expand the blank into all parts of the mold without creating too great a pressure to cause other damage and to expeditiously express from the bottle the air thus admitted and to circulate through the bottle cooling air at a high rate so that the bottle will be perfectly formed and will be rapidly cooled, thereby materially increasing the speed of operation of the machine.

For the purpose of disclosing our invention, we have illustrated in the accompanying drawings a molding machine, or so much thereof as is necessary for the understanding of our invention, and in these drawings, Fig. 1 is a plan view of so much of a molding machine as is necessary for the understanding of the invention;

Figs. 4 and 5 are disassociated views of the valve for controlling the admission of air to the mold.

Figure 2:
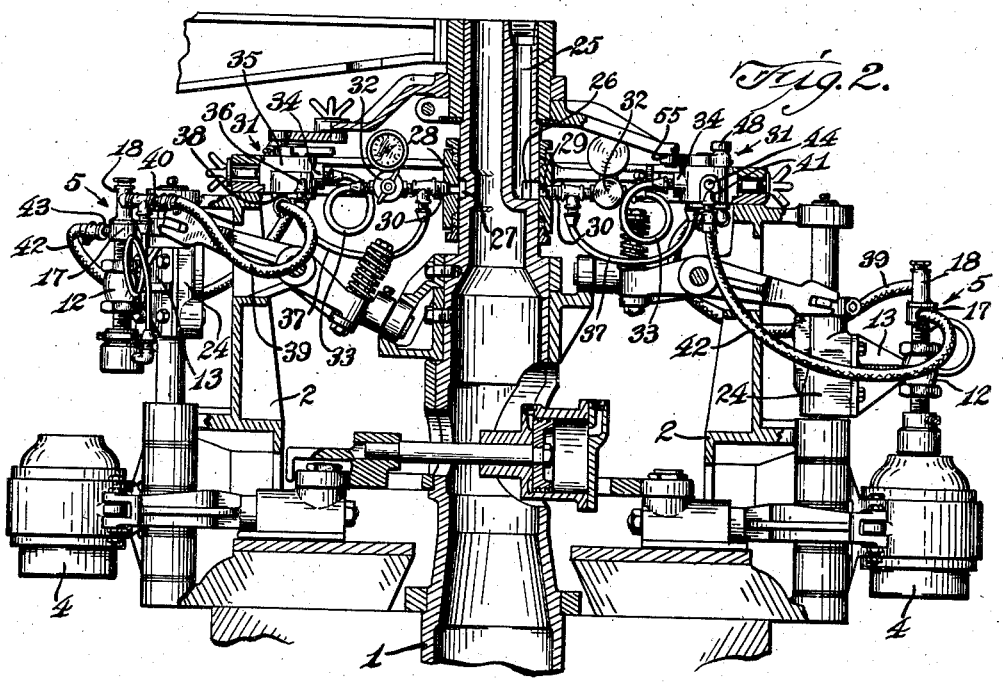
Fig. 2 is a longitudinal section.
Figure 3:
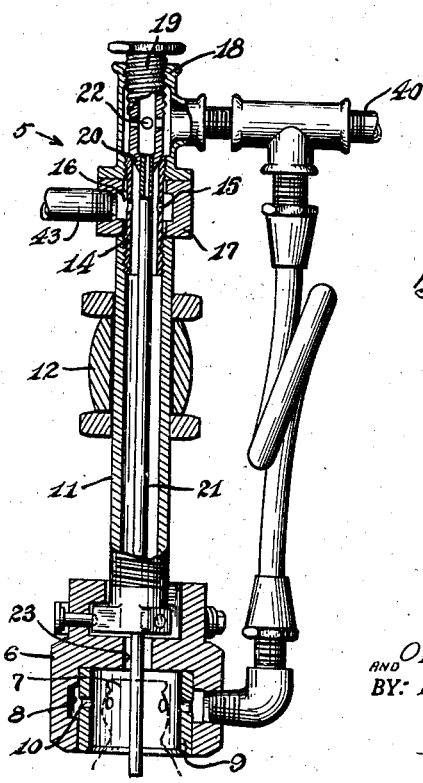
Fig. 3 is a longitudinal section of the blow head.

In the embodiment of the invention, the machine, as a whole, is of standard construction of the type illustrated in the patent to Bridges, dated July 31, 1930, No. 1,968,777 and, therefore, need only be described sufficiently for the purpose of understanding our invention. This machine, as is usual in the commercial type of machine, is provided with a central standard 1, preferably hollow, about which rotates a head 2 surrounding the standard, which head carries a plurality of molds 4 which, during their rotation, are adapted, at one stage, to open to receive the blank and then close for the purpose of receiving air, under pressure, to expand the blank into the mold. The mold is, of course, formed of two sections and the two sections are so shaped as to impart the necessary configuration to the bottle or other container. After the two sections of the mold have been closed, with the blank contained therein, a blow head 5 is lowered on top of the mold in order to admit air under pressure to the interior of the mold In the specific illustration shown, the blank deposited in the mold has already had the bottle neck formed therein and, as a matter of fact, this bottle neck projects above the top of the mold proper but is enclosed by the blow head.

More specifically, this blow head includes a head proper 6 having a hollow recess 7 provided on its side walls with an annular groove 8 and having an inner liner 9 provided with ports 10. The ports 10 in this liner coincide with the groove 8 and provide, in effect, air nozzles for directing streams of air against the neck of a bottle blank which projects above the mold proper. The head is preferably detachably mounted from a stem 11 which is threaded through a supporting nut 12 on a support 13. Due to the thread and nut arrangement, the vertical position of the blow head relatively to the top of the mold may be adjusted. At the upper end of the stem 11 is a threaded extension 14 which receives a hollow collar 17 having an annular groove 16 therein coinciding with air openings 15 in the stem 14. Above the stem 14 is mounted a T-coupling 18 into which is threaded a nipple 19 smaller in diameter, except at the threaded point, than the T-coupling. The lower end 20 of this nipple is tapered and seats on the top of the stem 14, thereby effectually sealing the top of the stem. This nipple carries a downwardly extending air pipe 21 which extends clear through the stem 11 and projects beyond the end of a head 6 so that when the head is at the sealing engagement with the mold 4, the pipe 21 will project through the neck of the bottle. This nipple 19 is provided with inlet ports 22 so that any air which is admitted to the body of the T-coupling 18 will pass through these ports into the nipple and through the nipple and pipe 21 into the bottle. At the point that the pipe 21 passes through the head 6, the opening 23 is enlarged and this enlarged opening communicates with the interior of the stem 11 so that the air passing down through the pipe 21 and into the bottle may then flow out through the stem 11 around the pipe 21 and through the ports or openings 15. We thus provide two channels for the passage of the air. One is the inlet channel through the pipe 21 and the other is the outlet channel through the stem 11.

The supporting nut 12 is carried on a suitable reciprocating support 24 and, by means of a reciprocation of this support, the raising and lowering of the blow head relative to the mold 4 is accomplished in proper time relation.

The air or other blowing medium is supplied through the medium of a conduit 25 formed within the standard 1 which conduit is connected with a suitable air compressor or other source of air supply. The lower end of this conduit communicates through an opening 26 with an annular groove 27 in the exterior of the standard 1. Surrounding this groove is an annular air box collar 28 having suitable openings 29 therein communicating with the groove 27 and receiving suitable piping 30, which provide conveying means for conveying the air to the blow heads. This air is conveyed to each blow head through the medium of suitable control valve 31, one for each blow head, which controls the admission of the air to the blow head controlled thereby.

The purpose of this valve 31 is to, first, admit what may be termed "blowing pressure" to the mold. This pressure is sufficient to expand the blank in the mold to cause the blank to conform to the shape of the mold, in other words, to blow the bottle, and; two, to momentarily close the mold against the escape of this blowing pressure and hold this blowing pressure in the mold until the bottle has been properly shaped, and then open the mold to the atmosphere and, at the same time, admit air to the mold under relatively high velocity or relatively higher pressure to rapidly blow out the heated blowing air or pressure and admit to the mold a free flowing stream of air which has a tendency to rapidly cool the bottle, thus preventing the sagging of the walls of the bottle and insuring a perfectly formed bottle when the same is delivered from the mold and to do this in a comparatively short time.

The air supply admitted through the supply pipe 25 is admitted to this supply pipe at the maximum pressure desired. Before the blowing air is admitted to the mold, it passes through a suitable reducing valve 32 which reduces the air pressure to the predetermined blowing pressure, and this reduced pressure is supplied through a suitable flexible conduit 33 to inlet port 34 formed in the body or casing 35 of the valve 31. This port 34 communicates with the interior of the valve body and provides for the inlet of the pressure air.

In addition to the inlet port 34, the valve body is provided with a second inlet port 36 which is adapted to be connected by the flexible conduit 37 with the air supply but beyond the reducing valve, so that the pressure admitted through the port 36 is considerably higher than the pressure admitted through the port 34. An outlet port 38 is provided in the valve casing, which port is connected by a flexible conduit 39 with a pipe 40 leading to the stem of the T-coupling 18 so that this port communicates with the air inlet pipe 21 of the blow head. In additon to the above described ports, I provide in the valve body a port 41 which is connected by the flexible conduit 42 with the pipe 43 with the collar 17 and an air escape port 44 which leads to the atmosphere.

These various ports are controlled by a rotary valve 45 which fits within the central opening 46 of the valve body, (it being understood that all of the ports heretofore described communicate with this central opening 46), and is supported from an operating head 47 resting upon the top of the valve body and carrying a cam roller 48. This valve 45 is provided, on its face on one side, with an annular groove 49 which is intersected by a vertical groove 50 and on its opposite side with a vertical groove 51. These grooves in the face of the valve 45 are so disposed that when the valve is in what may be termed its initial position, the grooves 49 and 50 connect the inlet port 34, which, it will be remembered, is the blowing pressure port, with the port 38, which port in turn is connected with the T-coupling 18. Therefore blowing pressure is admitted to the blow head, which pressure, it will be remembered, is taken through a reducing valve 32 through the conduit 33 and the port 34 to the groove 49. The blowing pressure passes around the groove 49 and as this groove for the valve in the initial position is in communication with the port 38, the blowing pressure air passes out through the port 38 by the way of the conduit 39 and the pipe 40 to the T-coupling 18 and thence through the pipe 21 to the interior of the mold. With the valve 45 in its initial position, the vertical groove 51 is out of coincidence with the ports 41 and 44 so that there is no chance for the air pressure, which is admitted to the mold, to escape. Therefore, the air pressure is momentarily or until the next stage of the valve is reached, held in the mold. This air pressure has a tendency to increase due to the fact that the mold blank, at this period, is extremely hot and the air within the mold blank and within the mold becomes extremely heated, thereby considerably raising the pressure of the air in the mold. However, this increased pressure, together with the initial pressure adapted to be admitted for blowing the bottle, is nicely calculated, so that the blowing pressure will not, during the short period it is held there, become too great. As the valve moves to its next position, the valve member 45 is rotated, placing the vertical slot 50 in communication with the port 36 and, at the same time, the vertical slot 51 is placed in communication with ports 41 and 44. Therefore, under these circumstances, we have a high pressure or high velocity air coming through the conduit 37, through port 36, through the vertical groove 50 and the groove 49 to port 38 and thence, by conduit 39, to the T-coupling 18 and pipe 21 to the interior of the bottle. At the same time, however, it is to be noted that the groove 51, having placed ports 41 and 44 into communication with one another and the port 41 being connected to the collar 17, the interior of the stem 11 is connected to the atmosphere by an opening which is equivalent in area to the inlet opening. Therefore, a stream of air under high velocity as the result of the increased pressure, is delivered through the bottle and this higher velocity air traveling through the bottle, unobstructedly, will not only drive out the blowing air, heretofore admitted to the bottle, but will deliver through the bottle a cooling stream of air, quickly cooling the bottle and materially assisting in rapidly setting the bottle.

On the next stage of operation of the valve, the valve 45 is rotated until all of the ports are out of communication and closed against inlet of air of any kind, and this constitutes the third stage of the valve which continues until the structure is rotated to begin the initial stage of procedure, as above described.

In addition to the above connection, it is to be noted that there is a connection between the pipe 40 and the annular groove 8 in the head 6. Therefore, in addition to supplying air to the interior of the bottle, a stream of air is delivered against the neck of the bottle which is received within the recess of the blow head, thus providing means for effectually cooling the neck of the bottle at the same time that the interior of the bottle is cooled.

For properly rotating the valve 45 into its respective positions corresponding to the three stages of operation, I provide a pair of adjustable cams 52 and 53, the cam 52 being adapted to engage the roller 48 for rotating the valve 45 to its initial position for the admission of blowing pressure to the mold. The continued rotation of the mold and blowing head causes the roller 48 to next strike the cam 53 which still further rotates the valve 45 to its second stage wherein the cooling air is admitted to the mold and eventually an arm 54 on the head 47 of the valve strikes a stationary roller 55 which rotates the valve 45 to its closed position.

It is thus seen that the blowing pressure is admitted to the mold for a comparatively short time and that the cooling pressure is admitted to the mold for a comparatively long period. These cams and rollers are stationarily mounted so as to be struck by the roller 48 during the rotation of the head, but each cam and roller is adjustable to permit a nice timing of the parts.

We have found, from experience, that very effective results have been produced in the operation of the machine heretofore described and in carrying out of the method heretofore described in molding, for example, a pint flask with rather sharp angles and corners, that an air pressure of substantially twenty pounds is sufficient for the blowing pressure and that thereafter air under pressure of thirty-five to forty pounds can be admitted or circulated through the molded flask for the purpose of cooling the same and that in articles of simpler configuration such, for instance, as a round gallon glass container, six pounds of pressure admitted for the purpose of blowing is sufficient and a cooling pressure of thirty-five to forty pounds is effective for properly cooling the container after the same has been shaped in the mold under the blowing pressure.

We have also found that steam under pressure can be used effectively for blowing and for cooling purpose.

We claim as our invention:

1. The method of producing hollow glass containers from hollow blanks which have been rendered plastic by heat, which consists in inserting a blank while plastic in a forming mold, closing said mold against the escape from the interior of said blank of any fluid under pressure which may be delivered thereto, delivering to the interior of said blank, through a suitable conduit having an inlet passage opening to the interior of the blank, blowing fluid under pressure while maintaining said mold sealed against the escape of said blowing fluid under pressure from the interior of said blank and then delivering to the interior of said blank through said inlet passage fluid under higher pressure than said blowing pressure and simultaneously opening to the atmosphere a passage from the interior of the blank independent of said inlet passage and of an area at least equal to the area of the inlet passage to permit an unrestricted flow of said fluid under higher pressure through the interior of said blank.

2. The method of producing hollow glass containers from hollow blanks which have been rendered plastic by heat, which consists in inserting a blank while plastic in a forming mold, closing said mold against the escape from the interior of said blank of any fluid under pressure which may be delivered thereto, delivering to the interior of said blank through a suitable conduit having an inlet passage opening to the interior of the blank, a blowing fluid under pressure while maintaining said mold sealed against the escape of blowing fluid under pressure and then unrestrictedly forcing fluid under pressure through the inlet passage to the interior of blank and through an opened outlet passage communicating with the interior of the blank and having an area at least equal to the area of the inlet passage.

3. The method of producing hollow glass containers from hollow blanks which have been rendered plastic by heat, which consists in inserting a blank while plastic in a forming mold, closing said mold against the escape from the interior of said blank of any fluid under pressure which may be delivered thereto, delivering to the interior of said blank through a suitable conduit having a passage opening to the interior of the blank, a blowing fluid under pressure while maintaining said mold sealed against the escape of said fluid under pressure from the interior of the blank and then delivering through the interior of said blank through said inlet passage and through an open outlet passage having an area at least as great as the area of the inlet passage, cooling fluid under pressure and at a greater velocity than could be obtained by permitting said blowing fluid under pressure to blow unrestrictedly through the interior of the blank.

4. The method of producing hollow glass containers from hollow blanks which have been rendered plastic by heat, which consists in inserting a blank while plastic in a forming mold, closing said mold against the escape from the interior of said blank of any fluid under pressure which may be delivered thereto, delivering to the interior of said blank through a suitable conduit having a passage opening to the interior of the blank, a blowing fluid under pressure while maintaining said mold sealed against the escape of said fluid under pressure from the interior of said blank and then delivering to the interior of said blank through said inlet passage fluid under higher pressure than said blowing fluid under pressure and simultaneously opening to the atmosphere a passage from the interior of the blank independent of said inlet passage and of an area at least equal to the area of the inlet passage to permit an inrestricted flow of said fluid under higher pressure to the interior of said blank and at the same time delivering a stream of cooling fluid under pressure against the neck of the container formed from said blank.

5. The method of producing hollow glass containers from hollow blanks which have been rendered plastic by heat, by an apparatus including a forming mold adapted to receive the plastic blank and a blow head, having a fluid inlet passage and a fluid outlet passage at least equal in area to that of the inlet passage, and adapted to cooperate with said mold to place said passages in communication with the interior of the blank and to seal the mold against the ingress and egress of fluid to and from the interior of said blank except through said passages, said method consisting in inserting a hollow blank in said mold while in its plastic state, closing said mold by said blow head with the escape passage of said blow head closed against the egress of any fluid pressure from the interior of the blank, delivering to the interior of the blank through said inlet passage blowing fluid under pressure while maintaining said outlet passage closed against the escape of said blowing fluid under pressure and then, while said blow head is still in sealing relationship with said mold, delivering to the interior of said blank through said inlet passage fluid under higher pressure the said blowing fluid under pressure and simultaneously permitting the unrestricted escape of said fluid under higher pressure by fully opening said outlet passage in said blow head.

6. The method of producing hollow glass containers from hollow blanks which have been rendered plastic by heat, by an apparatus including a forming mold adapted to receive the plastic blank and a blow head, having a fluid inlet passage and a fluid outlet passage at least equal in area to that of the inlet passage, and adapted to cooperate with said mold to seal the same against the ingress and egress of fluid to and from the interior of said blank except through said passages and place said passages in communication with the interior of the blank, said method consisting in inserting the hollow blank in said mold while in its plastic state, closing said mold by said blow head with the escape passage of said blow head closed against the egress of any fluid under pressure from the interior of the blank, delivering to the interior of the blank through said inlet passage blowing fluid under pressure, while maintaining said outlet passage closed against the escape of said blowing fluid under pressure and then while said blow head is still in sealing relationship with the mold, opening said outlet passage to its fullest extent and unrestrictedly forcing fluid under pressure through said inlet passage, the interior of the blank and out through said outlet passage.

OTTO H. SAMUELSON.
ANTHONY T. ZAPPIA.